J. L. BUSCH.
BURGLAR PROOF MECHANISM FOR BANKS.
APPLICATION FILED DEC. 7, 1920.
1,401,959. Patented Jan. 3, 1922.
2 SHEETS—SHEET 2.
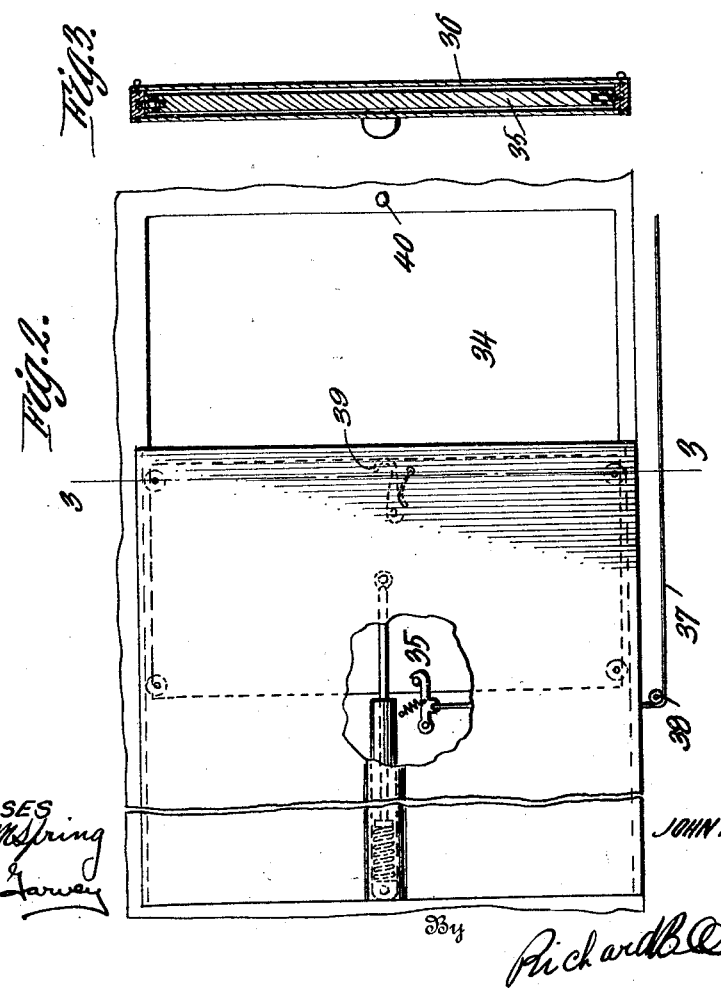
WITNESSES
Inventor
JOHN L. BUSCH

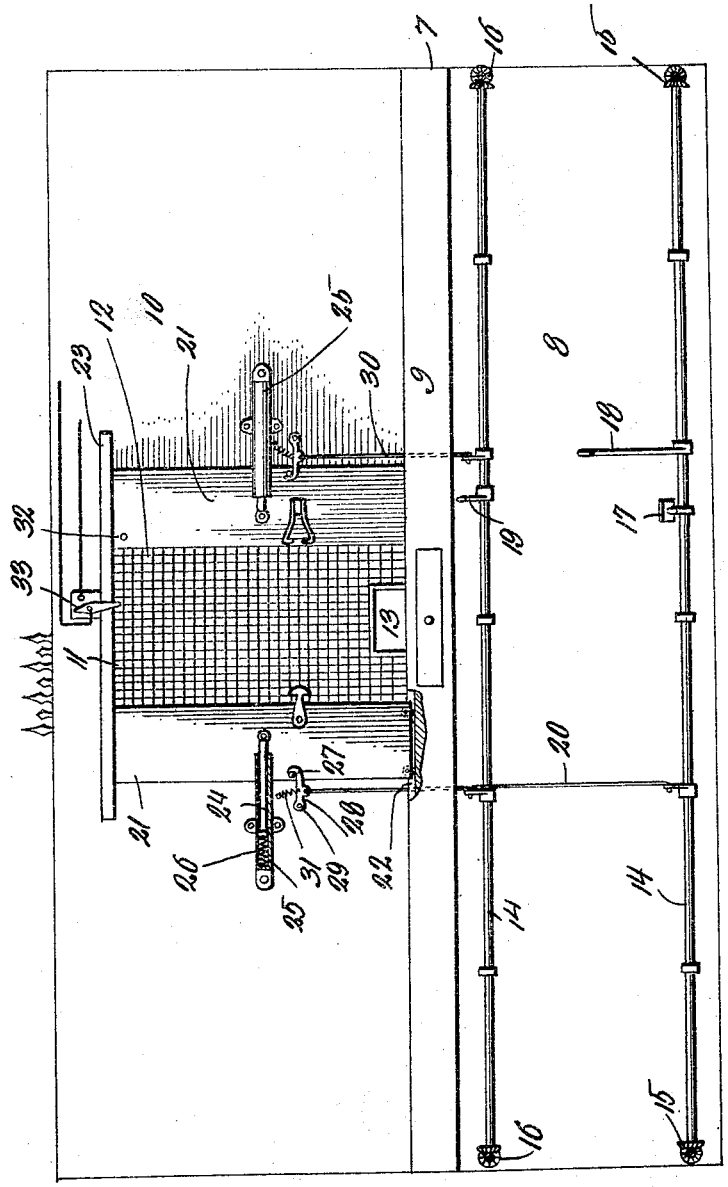

UNITED STATES PATENT OFFICE.

JOHN L. BUSCH, OF ST. LOUIS, MISSOURI.

BURGLAR-PROOF MECHANISM FOR BANKS.

1,401,959.   Specification of Letters Patent.   Patented Jan. 3, 1922.

Application filed December 7, 1920. Serial No. 428,975.

*To all whom it may concern:*

Be it known that I, JOHN L. BUSCH, a citizen of the United States, residing at St. Louis, in the county of St. Louis and State of Missouri, have invented certain new and useful Improvements in Burglar-Proof Mechanism for Banks, of which the following is a specification.

This invention relates to burglar proof mechanism for banks and has for a primary object the installation of apparatus which may be readily operated by the personnel of the bank to apprehend the intruders and prevent them injuring employees of the bank working behind the cages.

Another object of the invention is to provide mechanism operated by occupants of the bank behind the cages of the latter to give an audible signal and to simultaneously close the doors of the bank, thereby preventing escape of the burglars.

A still further object of the invention is to provide a simplified mechanism which automatically operates as soon as it has been initiated by anyone behind the cages.

The above and other objects of this invention will be in part described and in part understood from the following description of the present preferred embodiment of the invention taken in connection with the accompanying drawings, wherein:

Fig. 1, is a rear elevational view of a bank teller's cage embodying this invention.

Fig. 2, is a fragmentary side elevational view of a bank door embodying this invention, and Fig. 3, is a vertical sectional view taken on the line 3—3 of Fig. 2.

In the drawings, a bank partition generally designated 7 is provided which consists of a base 8, counter 9 and vertical wall 10, the latter being solid, except for the cage opening hereinafter referred to, this wall taking the place of the usual grill structure used in banks. The wall 10 is provided with an opening 11, which is partially enclosed by a grill or other suitable net-work structure 12. An opening 13 is provided in the grill to permit the passage of money or other articles therethrough. The counter 9 may be equipped with drawers or the like in a manner well known in the art.

Rotatably mounted on the inner face of the base portion 8 of the partition are a pair of rods 14, each of which is preferably circular in cross-section. One of said rods is arranged adjacent the lower end of said base, while the other rod is arranged in close proximity to the counter 9, the ends of these rods are equipped with beveled gear wheels 15 which engage in mesh with corresponding beveled gears 16, the latter being carried by rods which are arranged at right angles to the rods 14 in a manner hereinafter described. The lower of the rods 14 may be equipped with a pedal 17 for rotating the rods and likewise with a hand lever 18 so that either or both may be used in case of emergency. Moreover, the upper of the rods 14 has a hand lever 19 mounted thereon preferably directly below the cage opening 11 so as to be in convenient accessibility to the party working behind the cage. The rods 14 are connected by a link 20 so that rotation of either rod will simultaneously impart movement to the other rod.

A pair of sliding doors 21 are mounted in a groove or way 22 formed in the top of the counter 9. The lower margins of said doors are equipped with rollers so as to facilitate movement of said doors in the groove. The upper margins of said doors are encased in a frame 23 which is arranged directly above the cage opening 11. Each of the doors 21 is engaged by one end of a plunger 24, the opposite end of each of the latter being equipped with a circular head which is mounted in a cylinder such as indicated at 25. A cylinder is mounted on each side of the opening 11 and fixedly secured to the wall 10. A coil spring 26 is mounted in each cylinder, one end thereof being engaged with the inner end of the cylinder and the opposite end engaged with the enlarged head of the plunger. The expansive action of the springs 26 normally tend to urge the doors 21 toward each other. However, it is desired to hold the doors in an open position in order to permit communication through the cage opening 11, under normal conditions, and with this end in view a pin 27 is mounted upon each door and is adapted to be engaged by the bill of a hook 28. A hook such as that indicated at 28 is mounted upon each side of the opening 11, below the cylinders 25 and is pivotally engaged, as indicated at 29, to the wall 10. These hooks are connected to the upper rod 14 by links 30, as shown in Fig. 1. The hooks are normally retained in engagement with the pin 27 by coil springs 31.

It will consequently be apparent that any person standing behind the cage opening 11 may cause the doors 21 to be instantly closed by the exertion of pressure upon one of the foot pedals or hand levers so as to impart a rotary movement to either of the rods 14. This in turn will cause the hook 28 to be pulled downwardly against the resistance of the springs 31, thereby permitting expansive action of the springs 26 and correspondingly closing movement of the doors. Not only does this close communication through the cage opening but moreover in view of a trip 32 mounted upon one of the doors 21 an electrical switch 33 will be closed to give an audible signal outside of the bank. This same arrangement of cage opening, doors for closing the same, etc., may be arranged in the different parts of the bank and all simultaneously operated by the movement of any one of the rods in any part of the bank. This is accompanied by gearing all of the rods together as indicated by the gear wheels 15 and 16 in Fig. 1.

Furthermore, if desired, the doors of the bank may be in circuit with the rods 14 so as to be operated upon the rotation of any one of said rods. For instance, in Fig. 2, a door opening 34 is shown which is adapted to be closed by a door 35. The door is normally retained in a frame or casing 36 as illustrated to advantage in Fig. 3. The lower end of the door is equipped with rollers which are mounted in corresponding grooves in the bottom of the door casing. The same construction is used in the top of the door, thereby permitting free movement of the door so as to readily project the same from the casing. After the door leaves the casing the rollers thereon will pass through grooves formed above and below the door opening 34. To cause automatic closing movement of the door 35 upon rotation of any one of the rods 14, the same mechanism as that shown in Fig. 1 of the drawings is used, this consisting of a cylinder, spring pressed plunger and spring retained hook, which holds the door open against resistance of the spring in the cylinder. A cable such as that shown at 37 in Fig. 2 may be engaged with the hook and trained over a suitable roller 38, then connected with one of the rods so as to be operated by movement of the latter. The door carries a hook 39 which automatically engages a stud 40 mounted upon the door frame, automatically by the closing movement of the door.

While I have above described the general principle of my invention it is nevertheless to be understood that there are details of the invention which may be embodied therein in order to produce a more practical operation of the invention. I therefore desire to be understood that changes may be made by me in this invention within the scope of the appended claim.

What is claimed is:

The combination of a bank protecting device comprising two oppositely disposed horizontally movable closures equipped with holding means and adapted, when in open position, to be held against compressed actuating springs, means for simultaneously releasing said holding means comprising two parallel rotatable rods disposed beneath the bank counter in such relation that the lower of said bars may be actuated by the foot and the upper of said bars actuated by the hand, said rods being interconnected in such manner that the actuation of either one will release the holding means and permit the compressed springs to actuate the closures toward each other into fully closed position, and automatic means carried partly by one and partly by the other of said closures for retaining the closures in tightly closed position.

In testimony whereof I affix my signature in presence of two witnesses.

JOHN L. BUSCH.

Witnesses:
OTTO H. MUELLER,
PAUL E. HARTMANN.